US009380213B2

(12) United States Patent
Huang et al.

(10) Patent No.: US 9,380,213 B2
(45) Date of Patent: Jun. 28, 2016

(54) IMAGE COMPOSITION APPARATUS AND METHOD

(71) Applicant: HTC Corporation, Taoyuan Taoyuan County (TW)

(72) Inventors: Liang-Kang Huang, Taoyuan (TW); Chun-Hsiang Huang, Taoyuan (TW); Tzu-Hao Kuo, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/166,899

(22) Filed: Jan. 29, 2014

(65) Prior Publication Data
US 2014/0219582 A1 Aug. 7, 2014

Related U.S. Application Data

(60) Provisional application No. 61/759,448, filed on Feb. 1, 2013, provisional application No. 61/759,444, filed on Feb. 1, 2013, provisional application No. 61/759,440, filed on Feb. 1, 2013.

(51) Int. Cl.
H04N 5/232 (2006.01)
G11B 27/034 (2006.01)
G11B 27/34 (2006.01)
G06T 11/60 (2006.01)
G06T 3/40 (2006.01)

(52) U.S. Cl.
CPC .......... H04N 5/23293 (2013.01); G06T 3/4038 (2013.01); G06T 11/60 (2013.01); G11B 27/034 (2013.01); G11B 27/34 (2013.01); H04N 5/23216 (2013.01); H04N 5/23229 (2013.01)

(58) Field of Classification Search
CPC ........................... H04N 1/3872; H04N 1/3875
USPC .......................................................... 382/284
See application file for complete search history.

(56) References Cited

U.S. PATENT DOCUMENTS

| 5,398,309 | A  | * | 3/1995  | Atkins et al. ................. 345/634 |
| 5,649,032 | A  | * | 7/1997  | Burt et al. .................... 382/284 |
| 5,787,199 | A  | * | 7/1998  | Lee ............................. 382/203 |
| 6,075,905 | A  | * | 6/2000  | Herman et al. ............... 382/284 |
| 6,137,498 | A  | * | 10/2000 | Silvers ......................... 345/629 |
| 6,349,153 | B1 | * | 2/2002  | Teo .............................. 382/294 |
| 6,591,011 | B1 | * | 7/2003  | Nielsen ........................ 382/218 |
| 7,469,074 | B2 | * | 12/2008 | Adams et al. ................ 382/284 |
| 7,565,028 | B2 | * | 7/2009  | Saed ............................. 382/284 |
| 7,860,343 | B2 |   | 12/2010 | Tico et al.                        |
| 8,135,270 | B2 | * | 3/2012  | Tanaka ......................... 396/104 |
| 8,736,751 | B2 | * | 5/2014  | Yun ............................. 348/370 |
| 2005/0147322 | A1 | * | 7/2005  | Saed ............................ 382/284 |
| 2008/0232712 | A1 | * | 9/2008  | Matsui et al. ................ 382/277 |
| 2008/0317305 | A1 | * | 12/2008 | Cover et al. .................. 382/128 |
| 2010/0166337 | A1 | * | 7/2010  | Murashita et al. ............ 382/284 |

* cited by examiner

Primary Examiner — Kim Vu
Assistant Examiner — Molly Delaney
(74) Attorney, Agent, or Firm — McClure, Qualey & Rodack, LLP

(57) ABSTRACT

Image composition apparatuses and methods are provided. The image composition method includes the steps of receiving a plurality of images having at least partial common scene, performing analysis on the plurality of images to determine at least one image feature of the plurality of images, determining at least two sub-regions by comparing the image feature between the plurality of images, determining at least two portions selected from at least two source images among the plurality of images, the at least two portions comprising the at least two sub-regions, generating a composite image by combining the at least two portions, and providing the composite image to a user.

28 Claims, 7 Drawing Sheets

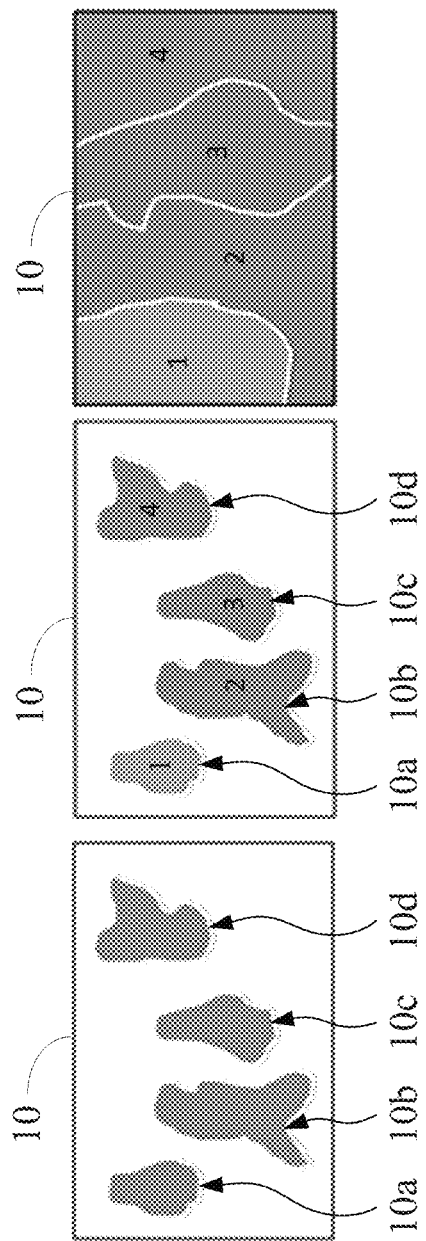

IMAGE COMPOSITION APPARATUS AND METHOD

This application claims the benefit of U.S. Provisional Application Ser. Nos. 61/759,440, 61/759,448, and 61/759,444 filed on Feb. 1, 2013, which are hereby incorporated by reference in its entirety.

CROSS-REFERENCES TO RELATED APPLICATIONS

Not applicable.

BACKGROUND OF THE INVENTION

1. Field of the Invention

The present invention relates to image composition apparatuses and methods; more particularly, the present invention relates to image composition apparatuses and methods that generate a composite image by combining portions of different source images.

2. Descriptions of the Related Art

Digital image capture devices/units (e.g. digital camera mobile devices) have been evolved fast with better functionality and performances and are capable to capture multiple images in a relatively short time. User may perform burst mode shooting to capture a series of images either automatically or manually. Normally, such series of images are captured with the same scene and object(s). Once such series of images are obtained, the series of images can be further processed to generate composite images with particular effect or composition.

Image composition is about generating a pleasant composite image with desired effect by combining different parts of two or more images. Although lots of techniques and applications for composing images have been developed, most of them deal with images taken from different views and hence focus on accurately segmenting regions for composition and color blending at the boundaries of the composed regions. In the meantime, for those conventional image composition techniques, regions to be composed usually can be easily identified.

In reality, images usually contain incomplete or noisy information about the desired regions so that the regions to be composed are often poorly identified. That is, the initially obtained regions may have significant parts of unnecessary or undesired pixels but miss great parts of desired pixels. In addition, the regions may have significant overlapping with counterparts in other images. The imprecision of the identified regions to be composed are not considered by conventional image composition technique. Although this problem may be a proper task for the well-known graph-cut framework to work on, graph-cut may not be a practical solution for media production, as its memory-intensive nature prevents it from dealing with high resolution images on moderate computing platform. Besides, such optimization approaches are often not intuitive for further tuning and evaluation.

Consequently, there is still an urgent need for an efficient image composition technique that can deal with the regions that can only be poorly identified.

SUMMARY OF THE INVENTION

To solve the aforementioned problems, the present invention provides image composition apparatuses and methods.

The image composition apparatus of the present invention comprises an interface module, a confidence analysis module, a sub-region extraction module, a source determination module, and a sub-region growth module. The interface module is configured to receive a plurality of images, wherein the images are aligned and are defined by a plurality of positions and each of the images comprises a pixel at each of the positions. The confidence analysis module is configured to calculate a confidence value for each pixel of each image. The sub-region extraction module is configured to suppress a portion of the positions according to the confidence values and determine a plurality of sub-regions for a composite image according to the unsuppressed positions. The source determination module is configured to determine a source for each of the sub-regions, wherein each of the sources is one of the images. The sub-region growth module is configured to grow the sub-regions until the composite image is filled by the sub-regions and fill each of the sub-regions by the pixels in a corresponding sub-region of the corresponding source.

The image composition method of the present invention is executed by a computing apparatus and comprises the steps of: (a) receiving a plurality of images, wherein the images are aligned and are defined by a plurality of positions, each of the images comprises a pixel at each of the positions, (b) calculating a confidence value for each pixel of each image, (c) suppressing a portion of the positions according to the confidence values, (d) determining a plurality of sub-regions for a composite image according to the unsuppressed positions, (e) determining a source for each of the sub-regions, wherein each of the sources is one of the images, (f) growing the sub-regions until the composite image is filled by the sub-regions, and (g) filling each of the sub-regions by the pixels in a corresponding sub-region of the corresponding source.

Yet another image composition method of the present invention is executed by an image processing unit and comprises the steps of: (a) receiving a plurality of images, the plurality of images comprising at least partial common scene, (b) performing analysis on the plurality of images to determine at least one image feature of the plurality of images, (c) determining at least two sub-regions by comparing the image feature between the plurality of images, (d) determining at least two portions selected from at least two source images among the plurality of images, the at least two portions comprising the at least two sub-regions, (e) generating a composite image by combining the at least two portions, and (f) providing the composite image to a user.

Briefly speaking, the present invention mainly calculates a confidence value for each pixel of each of the inputted images, suppresses a portion of the positions according to the confidence values, determines a plurality of sub-regions for a composite image according to the unsuppressed positions, determines a source for each of the sub-regions from the inputted images, grows the sub-regions until the composite image is filled by the sub-regions, and fills each of the sub-regions by the pixels in a corresponding sub-region of the corresponding source.

According to the above description, it is learned that instead of deciding whether each position should be a part of a sub-region, the present invention suppresses positions that may not be covered by a sub-region. Hence, the sub-regions determined by the present invention have strong tendencies on which source image they should come from (or which source image they should not come from) and meanwhile possible overlapping of multiple foreground objects is dealt with. Since the sub-regions are well determined, a pleasant composite image is then generated.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIGS. 1A, 1B, and 1C illustrate the concept of the present invention;

DESCRIPTION OF THE PREFERRED EMBODIMENT

In the following description, the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that elements unrelated to the present invention are omitted from depiction in the following embodiments and the attached drawings.

Please refer to FIGS. 1A, 1B, and 1C for the concept of the present invention. The objective of the present invention is to generate a composite image 10 based on a plurality of images (e.g. the multiple images 1, 2, 3, 4). The images 1, 2, 3, 4 are of a static scene and may contain one or more moving objects, while the composite image 10 may be a clean plate of the images 1, 2, 3, 4 or an image having the moving objects contained in the images 1, 2, 3, 4 along with a background. To achieve the objective, the present invention mainly divides the composite image 10 into several sub-regions 10a, 10b, 10c, 10d as shown in FIG. 1A, decides the pixels of each of the sub-regions 10a, 10b, 10c, 10d coming from which of the images 1, 2, 3, 4 (e.g. the sub-regions 10a, 10b, 10c, 10d are decided coming from the images 1, 2, 3, 4 respectively as shown in FIG. 1B), and propagates the decision to near-by pixels of the sub-regions 10a, 10b, 10c, 10d. When two growing sub-regions encounter, blending can be performed to combine pixel values from two source images. After the propagation, the composite image 10 is completely derived. Various embodiments illustrating the present invention will be given below.

Figure 2A:
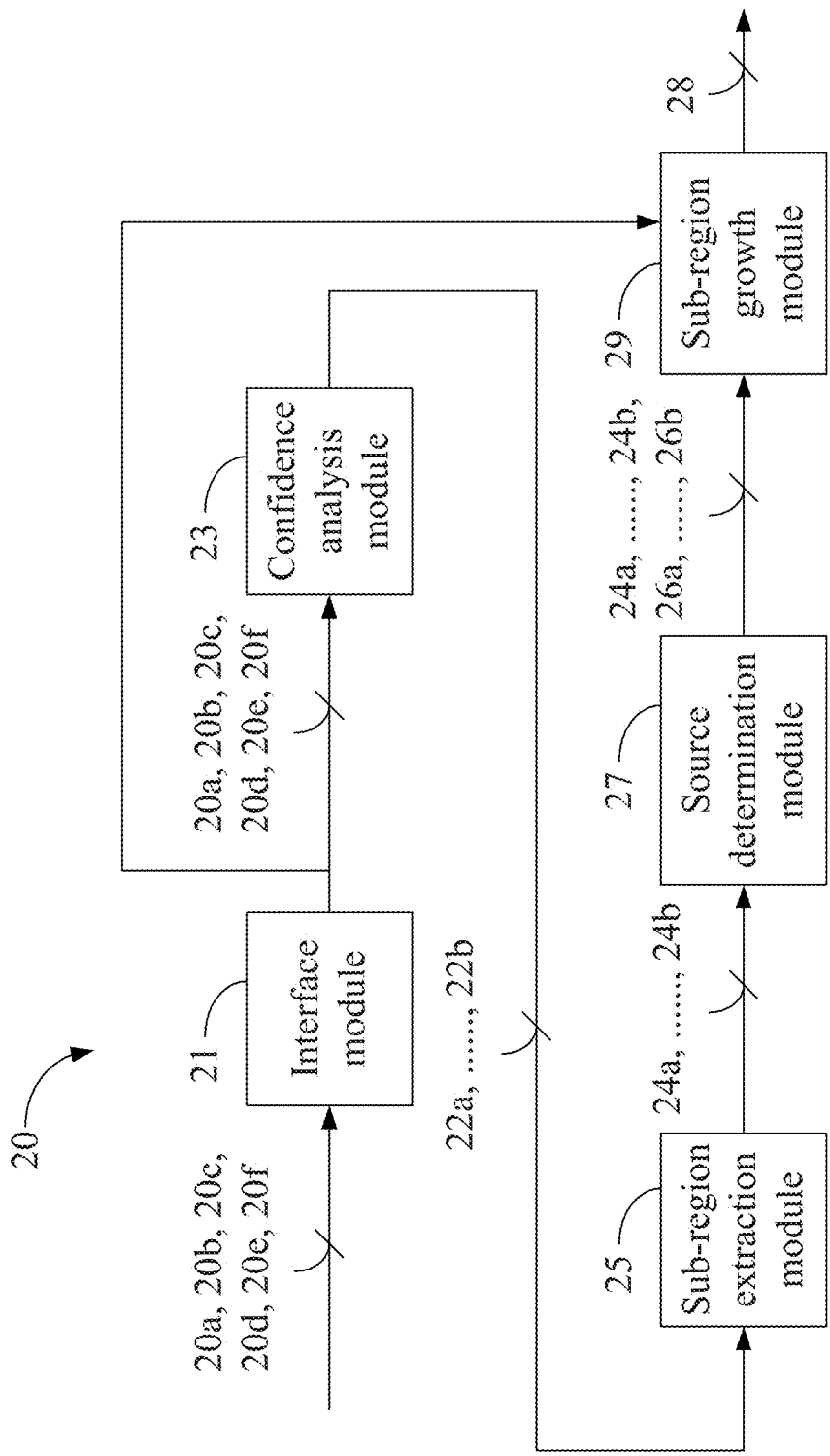
FIG. 2A illustrates a schematic view of the image composition apparatus of the first embodiment.

A first embodiment of the present invention is an image composition apparatus 20 and a schematic view of which is illustrated in FIG. 2A. The image composition apparatus 20 comprises an interface module 21, a confidence analysis module 23, a sub-region extraction module 25, a source determination module 27, and a sub-region growth module 29. The confidence analysis module 23 is electrically connected to the interface module 21 and the sub-region extraction module 25, while the source determination module 27 is electrically connected to the sub-region extraction module 25 and the sub-region growth module 29. The interface module 21 may be any interface module that can receive and transmit data.

Each of the confidence analysis module 23, the sub-region extraction module 25, the source determination module 27, and the sub-region growth module 29 may be realized by an individual processing unit or the like. In some other embodiments, the confidence analysis module 23, the sub-region extraction module 25, the source determination module 27, and the sub-region growth module 29 may be integrated as an individual processing unit or the like. Yet in other embodiments of the invention, the confidence analysis module 23, the sub-region extraction module 25, the source determination module 27, and the sub-region growth module 29 may be implemented as software programs or code sections that can be executed by one or more hardware processing units.

Figure 2B:
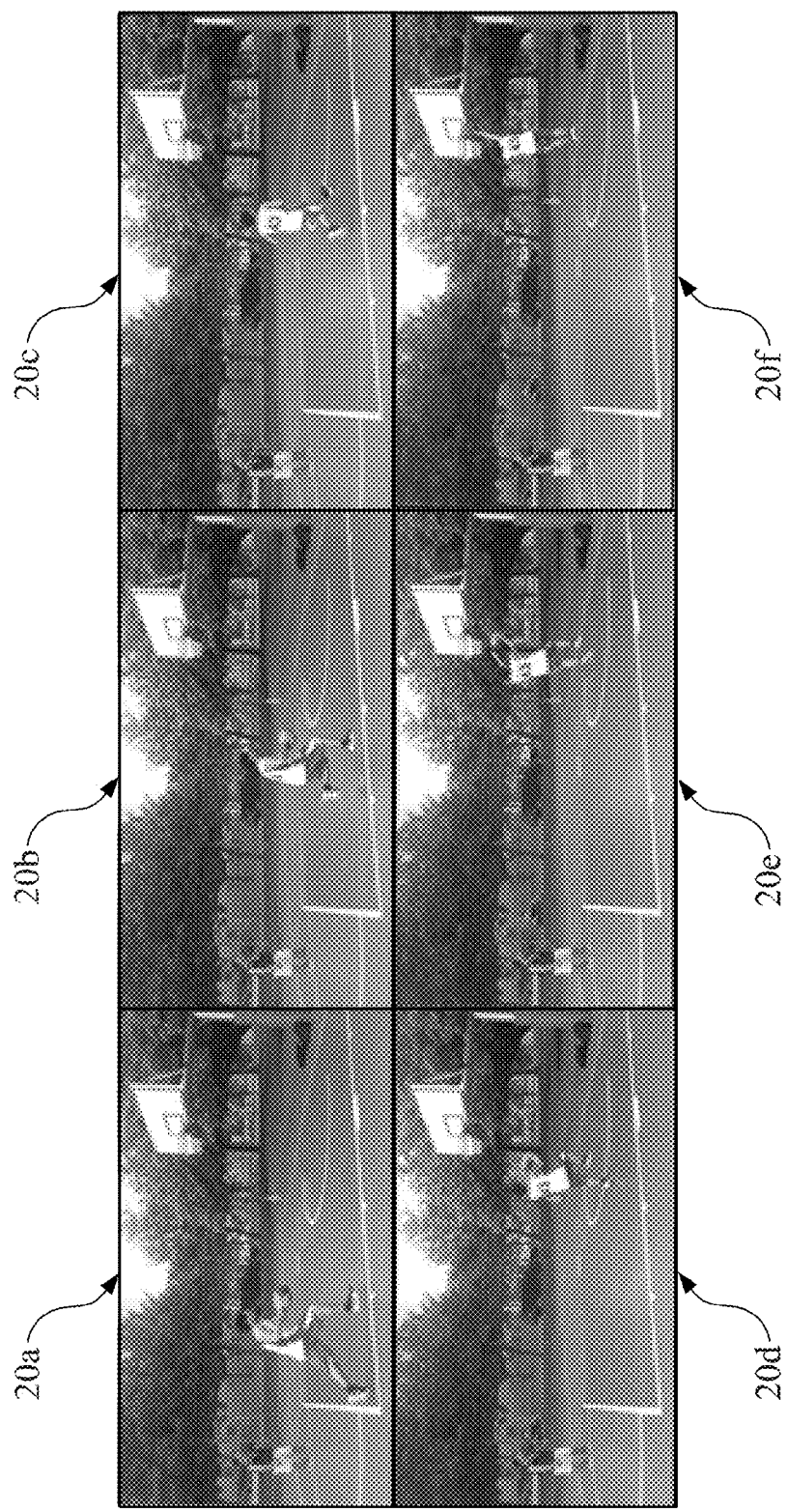
FIG. 2B illustrates the images received by the image composition apparatus of the first embodiment.

The interface module 21 receives a plurality of images 20a, 20b, 20c, 20d, 20e, 20f of a static scene as shown in FIG. 2B. The images 20a, 20b, 20c, 20d, 20e, 20f are defined by a plurality of positions; in other words, each of the images 20a, 20b, 20c, 20d, 20e, 20f has a pixel at each of the positions. In addition, each pixel of each of the images 20a, 20b, 20c, 20d, 20e, 20f has a pixel value. In this embodiment, the images 20a, 20b, 20c, 20d, 20e, 20f are aligned so that the corresponding points respect to part of the static scene would be at the same position in each of the images 20a, 20b, 20c, 20d, 20e, 20f.

Several remarks should be emphasized herein. First, the present invention does not limit the number of images that the interface module 21 can receive, although six are received in this embodiment. Second, an image composition apparatus of the present invention may be equipped with an additional image alignment module. For those embodiments, the interface module 21 may receive images that have not been aligned and the image alignment module will align the received images.

Next, the confidence analysis module 23 calculates a confidence value for each pixel of each of the images 20a, 20b, 20c, 20d, 20e, 20f. Each confidence value can be understood as how possible will the pixel appear on a composite image 28. The confidence analysis module 23 calculates the confidence values based on different strategies depending on the effect/content (e.g. a clean plate, multiple objects, or else) expected to be possessed by the composite image 28, which will be described separately in the below description.

When the goal is to create a clean plate of a scene (i.e. the composite image 28 will be a clean plate), the confidence analysis module 23 may follow common background estimation techniques by calculating the statistics of the pixel values of the images 20a, 20b, 20c, 20d, 20e, 20f on the same position. Pixel values that appear more frequently would have higher confidence because creating a clean plate of a scene could be done by composing multiple background regions reside in each of the images 20a, 20b, 20c, 20d, 20e, 20f. Two concrete examples for calculating confidence values are given below; however, it should be noted that the ways for calculating confidence values are not limited to the following two examples.

In the first example, the confidence analysis module 23 performs the following operations for each of the positions: (i) determining an appearance frequency for each of the pixels at the position according to the pixel values of the pixels at the position and (ii) determining the confidence values of the pixels at the position to be a value that is positively correlated to the appearance frequencies of the pixels at the position.

Each of the confidence values is further normalized to a value between 0 and 1 and then updated by subtracting the confidence value from one. In the second example, the confidence analysis module 23 performs the following operations for each of the positions: (i) calculating a reference value according to the pixel values of the pixels at the position, wherein the reference value may be a median value, an average value, or the like, and (ii) deciding the confidence value of each of the pixels by calculating a difference of the pixel value and the reference value. Similarly, each of the confidence values is further normalized to a value between 0 and 1 and updated by subtracting the confidence value from one. As illustrated in the two examples, the confidence values have to be updated by subtracting them from one when the goal is to create a clean plate of a scene. In this way, the updated confidence values suggest the tendency of which image should not be selected as the source image of a sub-region in a later stage performed by the sub-region extraction module 25. In this embodiment, there will be six confidence values for a given position because there are six images 20a, 20b, 20c, 20d, 20e, 20f.

When the goal is to create the composite image 28 having the moving objects contained in the images 20a, 20b, 20c, 20d, 20e, 20f along with a background, the confidence analysis module 23 calculates the confidence values in an opposite manner. Two concrete examples for calculating confidence values are given below; however, it should be noted that the ways for calculating confidence values are not limited to the following two examples.

In the first example, the confidence analysis module 23 performs the following operations for each of the positions: (i) determining an appearance frequency for each of the pixels at the position according to the pixel values of the pixels at the position and (ii) determining the confidence values of the pixels at the position to be a value that is negatively correlated to the appearance frequencies of the pixels at the position. In the second example, the confidence analysis module 23 performs the following operation for each of the positions: calculating the confidence value of each of the pixels at the position by subtracting a pixel value at the position of a reference image (e.g. a clean background image) from the pixel value. In both examples, each of the confidence values may be further normalized to a value between 0 and 1.

Herein, it is emphasized that the following description related to the sub-region extraction module 25, the source determination module 27, and the sub-region growth module 29 are the core of the present invention. The core of the present invention gives a great tolerance for the imperfection and illness created in the process of generating the confidence values. Specifically, common problems that are likely to fail conventional image composition techniques (e.g. imperfect image alignment, imperfect background/foreground estimation, overlapping of regions to be composited, or only rough user inputs could be obtained) would all be taken into consideration in the image composition method in the present invention.

For convenience in the following description, it is assumed that the confidence values 22a, ..., 22b are derived after all the positions have been processed. It is noted that the larger the confidence value is, the more likely the pixel is at the background (or foreground). Each of the images 20a, 20b, 20c, 20d, 20e, 20f may further form a confidence map comprising the confidence values corresponding to all the pixels. Then, in the pixel suppression process of the composition stage (i.e. the operations performed by the sub-region extraction module 25), the confidence maps may be used to exclude undesired pixels within the input images.

Next, the sub-region extraction module 25 determines a plurality of sub-regions 24a, ..., 24b for the composite image 28 based on the confidence values 22a, ..., 22b. It is noted that by determining proper sub-regions 24a, ..., 24b, the impact of the imperfection and illness in the pre-processing stage (i.e. image alignment, confidence value calculations, etc.) could be reduced or recovered.

Briefly speaking, the sub-region extraction module 25 determines the sub-regions 24a, ..., 24b that show strong tendencies on which source image they should come from (or which source image they should not come from) and meanwhile deals with possible overlapping of multiple foreground objects. Instead of deciding whether each position should be part of a sub-region, the sub-region extraction module 25 suppresses a portion of the positions that may not be covered by a sub-region according to the confidence values 22a, ..., 22b and determines a plurality of sub-regions 24a, ..., 24b for the composite image 28 according to the unsuppressed positions.

The sub-region extraction module 25 determines the sub-regions 24a, ..., 24b for the composite image 28 based on different strategies depending on the effect/content (e.g. a clean plate, multiple objects, or else) expected to be possessed by the composite image 28 as well, which will be described separately in the below description.

When the goal is to create the composite image 28 having the moving objects contained in the images 20a, 20b, 20c, 20d, 20e, 20f along with a background, the sub-region extraction module 25 determines the sub-regions 24a, ..., 24b that show strong tendencies on which source image they should come from and deals with possible overlapping of multiple foreground objects. The sub-region extraction module 25 may suppress positions according to the following three criteria (i.e. the first, second, and third/replacing criteria) individually or in any combination.

Regarding the first criterion, the sub-region extraction module 25 perform the following operation for each of the positions: suppressing the position when the confidence values of the pixels of the images 20a, 20b, 20c, 20d, 20e, 20f at the position are all smaller than a first threshold. In other words, when the confidence values at a position are all smaller than the first threshold, there is no strong tendency of which source image should come from. Hence, the position is suppressed.

Regarding the second criterion, positions that are overlapped by two or more high-confidence foreground objects are dealt with. To be more specific, the sub-region extraction module 25 performs the following operations for each of the positions: suppressing the position when the confidence values of at least two pixels at the position are higher than a third threshold. The second criterion suppresses positions that have no strong tendency of which source image that they should come from.

Regarding the third criterion, the sub-region extraction module 25 perform the following operations for each of the positions: (i) determining the pixel that has the highest confidence value at the position, (ii) locating a neighboring pixel of the pixel that has the highest confidence value, and (iii) suppressing the position when the confidence value of the neighboring pixel is lower than a second threshold. The objective of the third criteria is dividing those overlapping object apart along the object edge of the one with a higher confidence. In some other embodiments, the aforementioned third criterion may be replaced by another criterion. Regarding this replacing criterion, the sub-region extraction module 25 performs the following operations for each of the positions: (i) locating a first source image that comprises the pixel having the highest confidence value at the position, the first source image is one of the images, (ii) locating a second source image that comprises the pixel having the highest confidence value at a neighboring position of the position, the second source image is one of the images, and (iii) suppressing the position when the first source image and the second source image are different and when the highest confidence value at the neighboring position is lower than a second threshold.

The idea of using the above first and second criteria is to leave the positions where do not show strong tendencies on which source image they should come from to be determined until the sub-region growing step performed by the sub-region growth module 29. In the meantime, the above second and third criteria deal with the overlapping that occurs between regions of different images. The third criterion suffices to deal with small area of overlapping between regions as it tends to cut apart the overlapped regions along the confidence edge of the region that contains higher confidence. But for large overlapping, often it is not able to obtain perfect cut-apart as it takes into consideration that the confidence value computed in the pre-processing stage may be noisy. Thus an additional step of checking the suppressed results is performed.

When the goal is to create a clean plate (i.e. the composite image 28 will be a clean plate), the sub-region extraction module 25 determines the sub-regions 24a, . . . , 24b that show strong tendencies on which source image they should not come from. This is because to create a clean plate, the same desired background part is likely to exist in two or more input images. Thus the main concern would be identifying foreground parts that should be avoided to put into the composed image 28. From this perspective, the sub-regions needed for creating a clean plate is actually pretty much like the sub-regions used for creating an image with multiple foreground objects. However, for creating a clean plate, it is not necessary for overlapping foreground objects to be separated, since in some cases, two or more foreground objects may be covered using a single piece of background parts. Hence, the sub-region extraction module 25 may suppress positions according to the aforementioned first and third/replacing criteria individually or in any combination.

After the sub-region extraction module 25 has dealt with all the positions, the sub-regions 24a, . . . , 24b for the composite image 28 are derived. It is noted that each of the sub-regions 24a, . . . , 24b is formed by a plurality of the connected positions of the unsuppressed positions.

Next, the source determination module 27 determines a source for each of the sub-regions 24a, . . . , 24b. It is assumed that the sources 26a, . . . , 26b are determined for the sub-regions 24a, . . . , 24b respectively. Each of the sources is one of the images 20a, 20b, 20c, 20d, 20e, 20f. To achieve a better performance, the source determination module 27 determines the source for each of the sub-regions 24a, . . . , 24b based on different strategies depending on the effect/content (e.g. a clean plate, multiple objects, or else) expected to be possessed by the composite image 28 as well, which will be described separately in the below description.

When the goal is to create the composite image 28 having the moving objects contained in the images 20a, 20b, 20c, 20d, 20e, 20f along with a background, the source determination module 27 performs the following operations for each of the sub-regions: (i) performing the following operation for each of the images: calculating an average confidence value for the image by the confidence values in a corresponding sub-region of the image and (ii) determining the source of the sub-region as the image having the highest average confidence value.

When the goal is to create a clean plate (i.e. the composite image 28 will be a clean background), the source determination module 27 performs the following operations for each of the sub-regions: (i) performing the following operation for each of the images: calculating an average confidence value for the image by the confidence values in a corresponding sub-region of the image and (ii) determining the source of the sub-region as the image having the lowest average confidence value.

Next, the sub-region growth module 29 grows the sub-regions 24a, . . . , 24b until the composite image 28 is filled by the sub-regions 24a, . . . , 24b and fills each of the sub-regions 24a, . . . , 24b by the pixels in a corresponding sub-region 24a, . . . , 24b of the corresponding source. It is noted that when two growing sub-regions encounter, blending can be performed to combine pixel values from two source images.

Figure 2C:
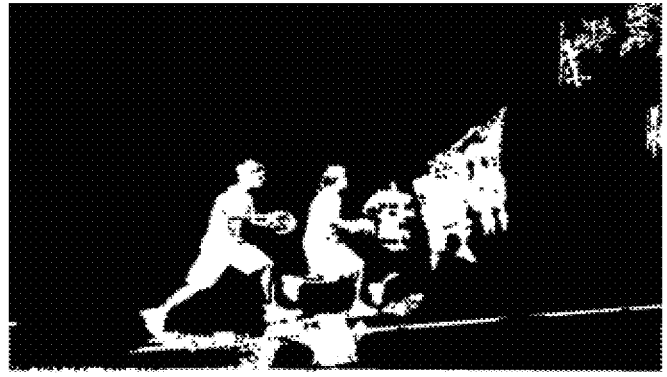
FIG. 2C illustrates the determined sub-regions when the goal is to create the composite image having the moving objects contained in the inputted images.
Figure 2D:
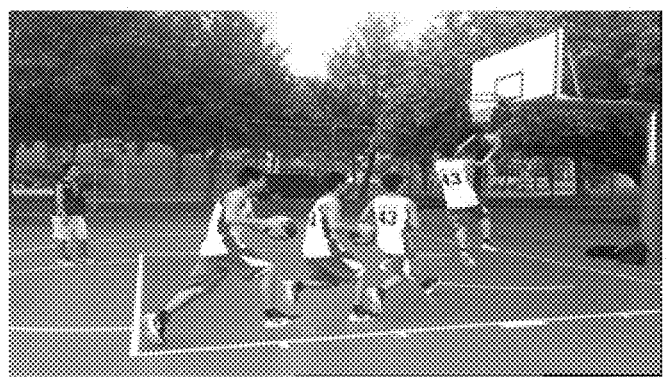
FIG. 2D illustrates the composite image that has the moving objects contained in the inputted images.

Please refer to FIGS. 2B, 2C, and 2D. As shown in FIG. 2B, the images 20a, 20b, 20c, 20d, 20e, 20f contains a person moving from one position to another across the scene. When the goal is to create the composite image 28 having the moving objects contained in the images 20a, 20b, 20c, 20d, 20e, 20f along with a background, the sub-regions 24a, 24b determined by the sub-region extraction module 25 based on the aforementioned first, second, and third/replacing criteria are shown in FIG. 2C. As can be observed, the resulting sub-regions 24a, . . . , 24b cover the positions of the person in the some of the images 20a, 20b, 20c, 20d, 20e, 20f, with small overlapping being cut apart and large overlapping being united. Thus, eventually only the person from the images 20a, 20b, 20c, 20e would present in the composite image 28 as shown in FIG. 2D. Although noisy confidence values cause some of the background positions (e.g. trees), lines of the basketball court, and some of the desirable foreground positions (e.g. the leg and head of the person in the image 20c) to be missed in FIG. 2C, these problems are solved to generate a final pleasant composite result 28 as in FIG. 2D.

Figure 2E:
FIG. 2E illustrates the determined sub-regions when the goal is to create a clean plate.
Figure 2F:
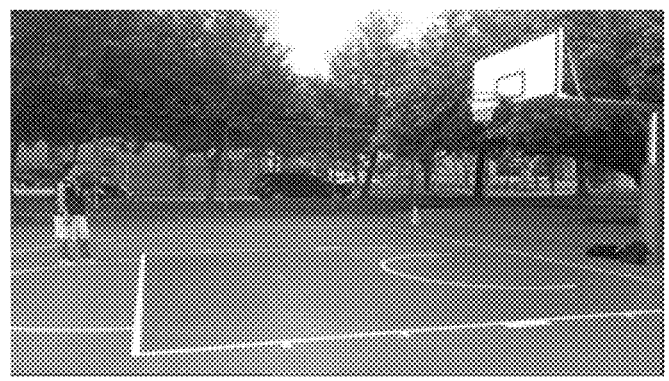
FIG. 2F illustrates the composite image that is a clean plate.

Please refer to FIGS. 2B, 2E, and 2F. When the goal is to create the composite image 28 that is a clean plate, the sub-regions 24a, . . . , 24b determined by the sub-region extraction module 25 based on the aforementioned first and third criteria are shown in FIG. 2E and the resultant composite image 28 is shown in FIG. 2F.

Please note that in this embodiment, the background image and the foreground image can be generated from different source images. In some other embodiments, user inputs may be received from another interface module (e.g. a touch screen). For those embodiments, the foreground image may be composed by input images designated by a user and the source images are limited to those designated source images.

Figure 3:
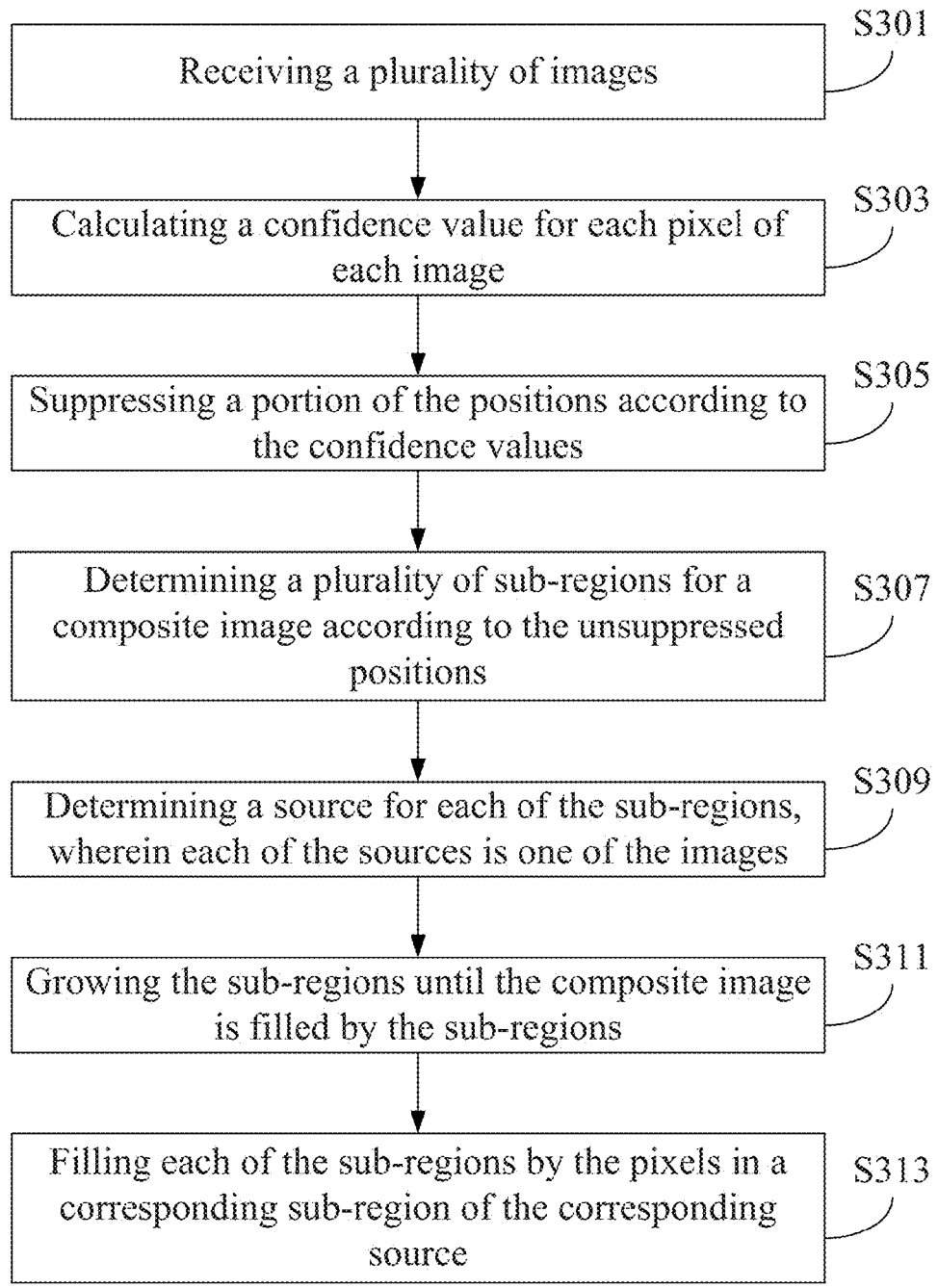
FIG. 3 illustrates a flowchart of the image composition method of the second embodiment.

A second embodiment of the present invention is an image composition method and a flowchart of which is illustrated in FIG. 3. The image composition method is executed by a computing apparatus such as the image composition apparatus 20 in the first embodiment.

At the beginning, step S301 is executed for receiving a plurality of images, wherein the images are aligned and are defined by a plurality of positions. In addition, each of the images comprises a pixel at each of the positions. Next, step S303 is executed for calculating a confidence value for each pixel of each image. To be more specific, the step S303 may calculate the confidence values by the same ways as those described in the first embodiment; hence, the details are not repeated herein.

Following that, step S305 is executed for suppressing a portion of the positions according to the confidence values. To be more specific, the step S305 may suppress the portion of the positions according to the confidence values by the same ways as those described in the first embodiment; hence, the details are not repeated herein. Next, step S307 is executed for determining a plurality of sub-regions for a composite image according to the unsuppressed positions. To be more specific, the step S307 may determine the sub-regions by the same ways as those described in the first embodiment; hence, the details are not repeated herein.

Following that, step S309 is executed for determining a source for each of the sub-regions, wherein each of the sources is one of the images. Particularly, the step S309 may determine the source for each of the sub-regions by the same ways as those described in the first embodiment; hence, the details are not repeated herein. Next, step S311 is executed for growing the sub-regions until the composite image is filled by the sub-regions. Subsequently, step S313 is executed for filling each of the sub-regions by the pixels in a corresponding sub-region of the corresponding source.

In addition to the aforesaid steps, the second embodiment can execute all the operations and functions set forth for the image composition apparatus 20 in the first embodiment. How the second embodiment executes these operations and functions will be readily appreciated by those of ordinary skill in the art based on the explanation of the first embodiment, and thus will not be further described therein.

Figure 4:
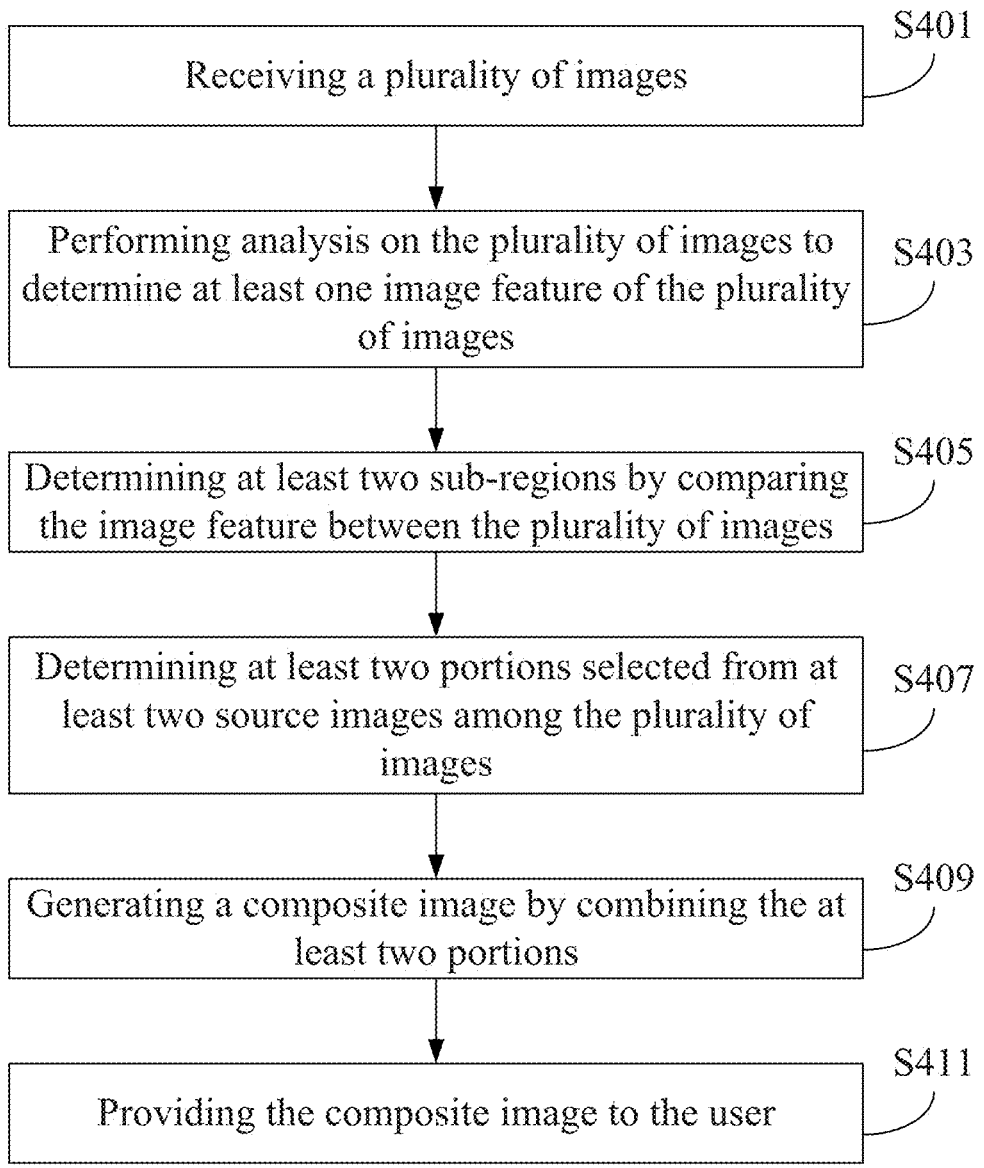
FIG. 4 illustrates a flowchart of the image composition method of the third embodiment.

A third embodiment of the present invention is an image composition method and a flowchart of which is illustrated in FIG. 4. The image composition method is executed by a computing apparatus such as the image composition apparatus 20 in the first embodiment.

Initially, the image composition method executes step S401 for receiving a plurality of images, wherein the plurality of images comprises at least partial common scene. Next, step S403 is executed for performing analysis on the plurality of images to determine at least one image feature of the plurality of images. In some other embodiments, the step S403 may be achieved by a step of performing image alignment of the plurality of images (not shown) and a step of determining a plurality of confidence values of pixels within the plurality of aligned images (not shown). It is noted that the ways for calculating the confidence values are the same as those described in the first embodiment; hence, the details are not repeated again herein. Subsequently, step S405 is executed for determining at least two sub-regions by comparing the image feature between the plurality of images. In some embodiments of the invention, step S405 may be achieved by the criterions described above.

Next, step S407 is executed for determining at least two portions selected from at least two source images among the plurality of images, wherein the at least two portions comprising the at least two sub-regions. It is noted that in some other embodiments, the image composition method may execute another step for providing the at least two source images to a user (not shown), another step for receiving a user input via a user interface module (not shown), and another step for determining the source images according to the user input (not shown). By these steps, the source images used in the step S407 can be determined.

Following that, step S409 is executed for generating a composite image by combining the at least two portions. In some embodiments, the step S409 may generate the composite image by the way as described in the first embodiment; hence, the details are not repeated herein. Next, step S411 is executed for providing the composite image to the user.

The image composition method of the second and third embodiments may be implemented by a computer program which is stored in a non-transitory tangible machine-readable medium. When the computer program is loaded into a computing apparatus, a plurality of codes comprised in the computer program will be executed by the computing apparatus to accomplish all the steps described in the second and third embodiments. This non-transitory tangible machine-readable medium may be a read only memory (ROM), a flash memory, a floppy disk, a hard disk, a compact disk (CD), a mobile disk, a magnetic tape, a database accessible to networks, or any other storage media with the same function and well known to those skilled in the art.

Briefly speaking, the present invention mainly calculates a confidence value for each pixel of each of the inputted images, suppresses a portion of the positions according to the confidence values, determines a plurality of sub-regions for a composite image according to the unsuppressed positions, determines a source for each of the sub-regions from the inputted images, grows the sub-regions until the composite image is filled by the sub-regions, and fills each of the sub-regions by the pixels in a corresponding sub-region of the corresponding source.

According to the above description, it is learned that instead of deciding whether each position should be a part of a sub-region, the present invention suppresses positions that may not be covered by a sub-region. Hence, the sub-regions determined by the present invention have strong tendencies on which source image they should come from (or which source image they should not come from) and meanwhile possible overlapping of multiple foreground objects may be dealt with as well. Since the sub-regions are well determined, a pleasant composite image is then generated.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An image composition apparatus, comprising:
an interface module, being configured to receive a plurality of images, wherein the images are aligned and are defined by a plurality of positions, each of the images comprises a pixel at each of the positions; and
a processing unit, being electrically connected to the interface module and configured to calculate a respective confidence value for each pixel of each image and suppress a portion of the positions, wherein each suppressed position is suppressed according to at least the confidence values corresponding to the suppressed position,
wherein the processing unit is further configured to determine a plurality of sub-regions for a composite image according to the unsuppressed positions,
determine a source for each of the sub-regions,
grow the sub-regions until the composite image is filled by the sub-regions, and fill each of the sub-regions by the pixels in a corresponding sub-region of the corresponding source, wherein each of the sources is one of the images.

2. The image composition apparatus of claim 1, wherein each pixel has a pixel value, the processing unit performs the following operation for each of the positions:

determining an appearance frequency for each of the pixels at the position according to the pixel values of the pixels at the position;

wherein the confidence values of the pixels at the position and the appearance frequencies of the pixels at the position are in a positive correlation.

3. The image composition apparatus of claim 1, wherein each pixel has a pixel value, the processing unit performs the following operations for each of the positions:

calculating a reference value according to the pixel values of the pixels at the position, the reference value being one of a median value and an average value;

wherein the confidence value of each of the pixels at the position is calculated as the difference of the pixel value to the reference value.

4. The image composition apparatus of claim 1, wherein each pixel has a pixel value, the processing unit performs the following operations for each of the positions:

determining an appearance frequency for each of the pixels at the position according to the pixel values of the pixels at the position;

wherein the confidence values of the pixels at the position and the appearance frequencies of the pixels at the position are in a negative correlation.

5. The image composition apparatus of claim 1, wherein each pixel has a pixel value, the confidence value of each of the pixels at the position is calculated by subtracting a pixel value at the position of a reference image from the pixel value.

6. The image composition apparatus of claim 1, wherein the processing unit suppresses the portion of the positions by performing the following operations for each of the positions:

suppressing the position when the confidence values of the pixels at the position are all smaller than a first threshold.

7. The image composition apparatus of claim 6, wherein the processing unit suppresses a portion of the positions by performing the following operations for each of the positions:

determining the pixel that has the highest confidence value at the position;

locating a neighboring pixel of the pixel that has the highest confidence value; and suppressing the position when the confidence value of the neighboring pixel is lower than a second threshold.

8. The image composition apparatus of claim 6, wherein the processing unit suppresses a portion of the positions by performing the following operations for each of the positions:

locating a first source image that comprises the pixel having the highest confidence value at the position, the first source image is one of the images;

locating a second source image that comprises the pixel having the highest confidence value at a neighboring position of the position, the second source image is one of the images;

suppressing the position when the first source image and the second source image are different and when the highest confidence value at the neighboring position is lower than a second threshold.

9. The image composition apparatus of claim 7, wherein the processing unit suppresses a portion of the positions by performing the following operations for each of the positions:

suppressing the position when the confidence values of at least two pixels at the position are higher than a third threshold.

10. The image composition apparatus of claim 1, wherein each of the sub-regions is formed by a plurality of connected positions of the unsuppressed positions.

11. The image composition apparatus of claim 1, wherein the processing unit performs the following operations for each of the sub-regions:

performing the following operation for each of the images:
calculating an average confidence value for the image by the confidence values in a corresponding sub-region of the image; and determining the source of the sub-region as the image having the lowest average confidence value.

12. The image composition apparatus of claim 1, wherein the processing unit performs the following operations for each of the sub-regions:

performing the following operation for each of the images:
calculating an average confidence value for the image by the confidence values in a corresponding sub-region of the image; and determining the source of the sub-region as the image having the highest average confidence value.

13. An image composition method, being executed by a computing apparatus and comprising the steps of:

(a) receiving a plurality of images, wherein the images are aligned and are defined by a plurality of positions, each of the images comprises a pixel at each of the positions;

(b) calculating a respective confidence value for each pixel of each image;

(c) suppressing a portion of the positions, wherein each suppressed position is suppressed according to at least the confidence values corresponding to the suppressed position;

(d) determining a plurality of sub-regions for a composite image according to the unsuppressed positions;

(e) determining a source for each of the sub-regions, wherein each of the sources is one of the images;

(f) growing the sub-regions until the composite image is filled by the sub-regions; and (g) filling each of the sub-regions by the pixels in a corresponding sub-region of the corresponding source.

14. The image composition method of claim 13, wherein each pixel has a pixel value and the image composition method further comprises the following steps of:

performing the following step for each of the positions:
determining an appearance frequency for each of the pixels at the position according to the pixel values of the pixels at the position, wherein the confidence values of the pixels at the position and the appearance frequencies of the pixels at the position are in a positive correlation.

15. The image composition method of claim 13, wherein each pixel has a pixel value and the image composition method further comprises the following steps of:

performing the following step for each of the positions:
calculating a reference value according to the pixel values of the pixels at the position, the reference value being one of a median value and an average value;

wherein the confidence value of each of the pixels at the position is calculated as the difference of the pixel value to the reference value.

16. The image composition method of claim 13, wherein each pixel has a pixel value and the image composition method further comprises the following steps of:

performing the following step for each of the positions:
determining an appearance frequency for each of the pixels at the position according to the pixel values of the pixels at the position;

wherein the confidence values of the pixels at the position and the appearance frequencies of the pixels at the position are in a negative correlation.

17. The image composition method of claim 13, wherein each pixel has a pixel value and the confidence value of each of the pixels at the position is calculated by subtracting a pixel value at the position of a reference image from the pixel value.

18. The image composition method of claim 13, wherein the step (c) comprises the following step of:
 performing the following operations for each of the positions:
 suppressing the position when the confidence values of the pixels at the position are all smaller than a first threshold.

19. The image composition method of claim 18, wherein the step (c) comprises the following step of:
 performing the following operations for each of the positions:
 determining the pixel that has the highest confidence value at the position;
 locating a neighboring pixel of the pixel that has the highest confidence value; and
 suppressing the position when the confidence value of the neighboring pixel is lower than a second threshold.

20. The image composition method of claim 18, wherein the step (c) comprises the following step of:
 performing the following operations for each of the positions:
 locating a first source image that comprises the pixel having the highest confidence value at the position, the first source image is one of the images;
 locating a second source image that comprises the pixel having the highest confidence value at a neighboring position of the position, the second source image is one of the images;
 suppressing the position when the first source image and the second source image are different and when the highest confidence value at the neighboring position is lower than a second threshold.

21. The image composition method of claim 19, wherein the step (c) comprises the following step of:
 performing the following operations for each of the positions:
 suppressing the position when the confidence values of at least two pixels at the position are higher than a third threshold.

22. The image composition method of claim 13, wherein each of the sub-regions is formed by a plurality of connected positions of the unsuppressed positions.

23. The image composition method of claim 13, further comprising the following steps of:
 performing the following operation for each of the images;
 calculating an average confidence value for the image by the confidence values in a corresponding sub-region of the image; and
 determining the source of the sub-region as the image having the lowest average confidence value.

24. The image composition method of claim 13, further comprising the following steps of:
 performing the following operation for each of the images;
 calculating an average confidence value for the image by the confidence values in a corresponding sub-region of the image; and
 determining the source of the sub-region as the image having the highest average confidence value.

25. An image composition method executed by an image processing unit, comprising the steps of:
 receiving a plurality of images, the plurality of images comprising at least partial common scene, each of the images comprising a plurality of pixels;
 performing analysis on the plurality of images to determine at least one image feature of the plurality of images, comprising the following step of:
 determining a respective confidence value for each pixel of each image;
 determining at least two sub-regions by comparing the image feature between the plurality of images;
 determining at least two portions selected from at least two source images among the plurality of images, the at least two portions comprising the at least two sub-regions;
 generating a composite image by combining the at least two portions; and
 providing the composite image to a user.

26. The image composition method of claim 25, further comprising the steps of:
 receiving a user input via a user interface module; and
 determining the source images according to the user input.

27. The image composition method of claim 25, further comprising the steps of:
 providing the at least two source images to the user.

28. The image composition method of claim 25, wherein the step of performing analysis on the images further comprises the step of:
 performing image alignment of the plurality of images;
 wherein the step of determining the plurality of confidence values of pixels is determined within the plurality of aligned images.

* * * * *